March 12, 1957

T. G. LUNDE 2,784,801

COMBINED AIR CLEANER AND VENT

Filed May 27, 1954

INVENTOR
THEODORE G. LUNDE
BY Williamson, Williamson,
Schroeder & Adams
ATTORNEYS

United States Patent Office

2,784,801
Patented Mar. 12, 1957

2,784,801

COMBINED AIR CLEANER AND VENT

Theodore G. Lunde, Minneapolis, Minn.

Application May 27, 1954, Serial No. 432,814

2 Claims. (Cl. 183—45)

This invention relates to a combined air cleaner and vent and more particularly to a device for permitting air to enter and to escape from sanitary tanks without permitting impurities to contaminate the internal space of the tank.

In the case of tanks such as are mounted on truck bodies and utilized for transporting liquids of an edible nature, it is of paramount importance to maintain the tank sterilized and to prevent dust and bacteria from gaining entrance into the interior. It has been a practice to provide milk transport trucks and the like with a vent cap which is maintained in sealed relation with the tank during transportation. Unfortunately, the cap is sometimes accidentally left in place during filling or emptying of the truck and valuable equipment can be broken or damaged as a result. Sometimes expensive stainless steel tanks are ruptured or bent badly under the vacuum created when the tank is emptied with the cap left in position on the vent. Even when it is removed, dust and bacteria from the atmosphere will enter the tank and contaminate the liquid as it is pumped out. Since the tanks are emptied, cleaned and sterilized once daily or between unloading and reloading the tanks, every portion of each tank must be thoroughly cleaned and be capable of sterilization. For this reason, elaborate air relief valves cannot be employed because of the problem in cleaning and sterilizing the internal parts thereof. Since the risk of dust and air contamination is considered the lesser evil as opposed to an unsterile cap portion of the tank, the users of such tanks and transporting equipment have continued to use the simple vent cap.

It is within the contemplation of this invention and a general object thereof to overcome the above noted objections in prior art practice and to provide a vent for a sanitary tank which will maintain continuous communication with the atmosphere for ingress and egress of clean air during respective emptying and filling operations.

More specifically, it is an object of the invention to provide a combined air cleaner and vent for mounting at the upper portion of a sanitary tank, the cleaner being easily dissembled for complete cleaning and sterilizing yet preventing damage to the tank and pumping equipment at all times while filtering air and preventing air-borne impurities from passing through the device.

These and other objects and advantages of the invention will more fully appear from the following description made in connection with the accompanying drawings, wherein like reference characters refer to the same or similar parts throughout the several views, and in which.

Figure 1:
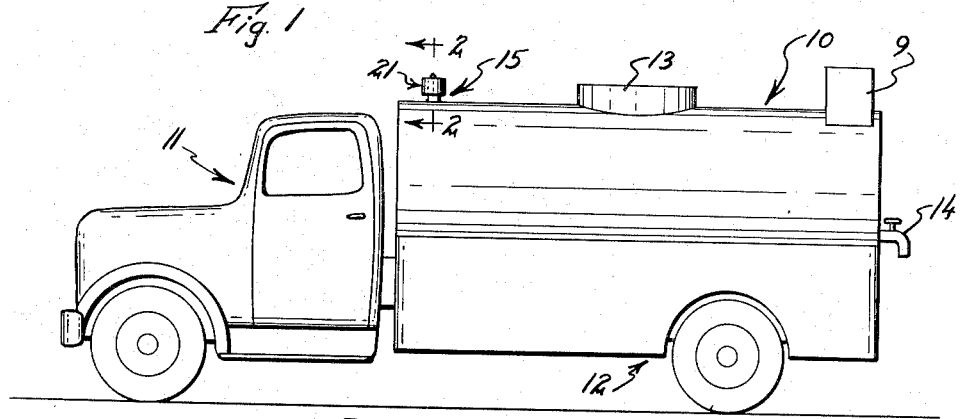
Fig. 1 is a side elevation of an ordinary milk tank truck which has been provided with my special air cleaner and vent.

With continued reference to the drawings, Fig. 1 shows a representative transport truck with a stainless steel milk tank indicated generally at 10 mounted to the rear of the cab portion 11 which in turn is mounted in the usual manner to the chassis 12 of the truck. The stainless steel tank 10 is provided with a manhole of clean-out door 13 and is also equipped with means 14 for emptying and filling the tank which usually comprises a valved outlet at one or more positions. It has been found practical to utilize the same valve or faucet arrangement for introducing milk as it is for the withdrawal thereof. The characteristic transport is also provided with a vent indicated generally at 15, the vent normally being provided with a removable cap member which is not shown but which has been replaced with my combined air cleaner and vent device.

Figure 3:
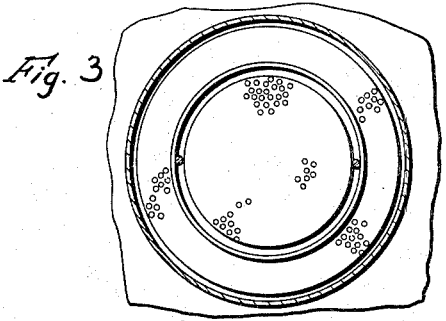
Fig. 3 is a horizontal section of the device taken on the line 3—3 of Fig. 2, unessential portions of the surrounding apparatus being deleted.
Figure 4:
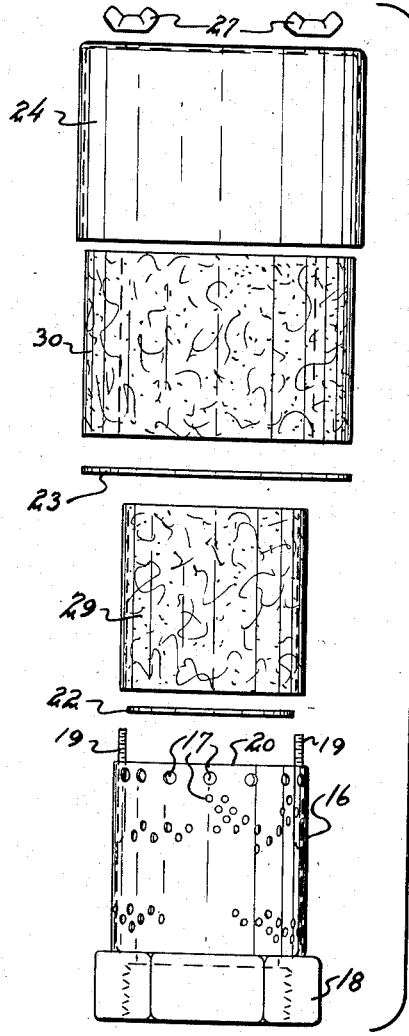
Fig. 4 is an exploded view of the assembly of parts comprising my apparatus, the individual parts being shown in their respective relative positions at the time of cleaning and before assemblage.
Figure 2:
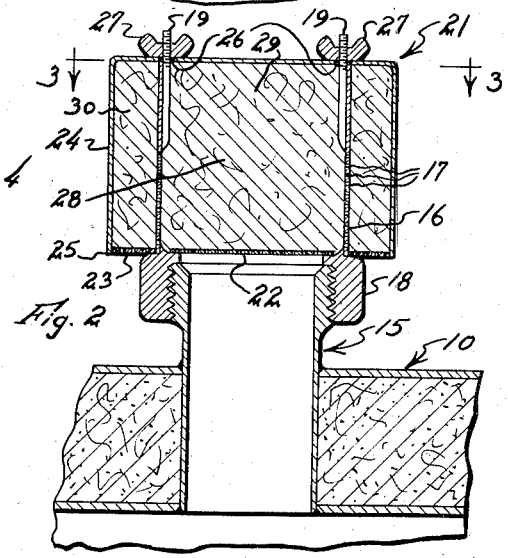
Fig. 2 is an enlarged vertical section of the device taken on the line 2—2 of Fig. 1, portions of the truck being broken away.

Referring now to Figs. 2, 3 and 4, my invention comprises an upstanding tubular baffle member 16 which is preferably cylindrical in shape and being provided with a plurality of openings or perforations 17 at the medial and upper portion thereof. The lower end of the upstanding tubular baffle 16 is provided with attachment means 18 for securing to the vent 15. Where the vent 15 is provided with upstanding thread means for the usual cap, the securing means 18 may constitute a hexagonal nut to which is secured as by welding, the cylindrical baffle 16. The upper end lower ends of the cylindrical baffle 16 are open and when mounted on the vent 15 provide open communication therewith. The cylindrical baffle 16 is so positioned with respect to the nut 18 that a portion of the nut provides an abutment at both sides of the bottom edge as shown in Figs. 2 and 4. Also secured to the baffle 16 are threaded studs 19 with the upper ends thereof extending above the top edge 20 of the baffle member 16. The studs 19 may be welded to the inner surface of the baffle 16 but in any event should form a smooth surface with the baffle member and be rust-resistant as well as free of corners and cavities which might catch impurities and cause contamination of the milk.

A casing member indicated generally at 21 has a lower perforate portion for engagement with the abutment 18 and preferably comprises a circular perforate member 22 for interfitting in close relation with the inside of cylindrical baffle 16 while lying at the lower end thereof in abutting relation with securing means 18. Also forming a portion of the total casing 21 is an outer annular perforate plate 23 which lies in close circumferential relation with the cylindrical baffle 16 and in abutting relation with the outwardly extending upper periphery of fastening means 18 as shown in Fig. 2.

The other portion of the casing member 21 comprises a cap 24 which is adapted to overlie the upper end of the cylindrical baffle 16 and to cooperate at its lower peripheral edge 25 with the annular perforate plate 23 as shown. The cap 24 is provided with openings 26 which are adapted to register with the studs 19 so that the cap member 24 may be held in position by wing nuts 27.

A mass of removable fibrous filter material of a washable and sterilizable nature such as stainless steel wool 28, is provided at the inner circumference of the cylindrical baffle 16 at 29, and another portion 30 thereof is disposed at the outer circumference of the cylindrical baffle 16. Each of these masses of filter material closely surrounds the baffle member and are supported by the perforate plates 22 and 23 as shown. It is preferred that the filter material be made from stainless steel wool which has been compacted into the proper shape to interfit with the parts as described and, in addition, may be made more efficient in filtering properties by pre-dipping before each use with such material as mineral oil to provide a thin coating for catching dust and bacteria.

In the use and operation of my invention, the tank 10 may be provided with special vent means in the form of passageway 15 or the conventional vent may be employed with the usual cap removed therefrom. The baffle cylinder, together with the integrally secured nut member 18, is then threadably mounted upon vent passageway 15 and the perforate plates 22 and 23 are dropped into abutting relation therewith. The cores of fibrous filter material 29 and 30 are then positioned respectively at the inner circumference and the outer circumference of the cylindrical baffle 16 and resting upon the perforate plates 22 and 23 respectively. Cap 24 is then placed with its openings 26 in registry with studs 19 and the wing nuts 27 are placed thereover and turned down tightly. During the day when milk is being collected, the pump mechanism 9 is attached to the means 14 and milk is introduced into the tank through the means so as to raise the level of the liquid within the tank body. As the liquid rises, air is displaced from above through the vent 15, upwardly through the perforations in plate 22, through the mass of filter material 29, through the perforations 17 in baffle 16, through the filter material 30, and downwardly and out into the atmosphere through the perforate annular plate 23. When the tank is emptied through the same means 14, air will reversely flow through the same elements and fill the space above the liquid in the tank.

After the tank has been used and emptied, it is washed and sterilized so as to prepare it for the next trip. An important part of this invention is the particular assemblage of the parts so that they present a minimum of possibilities for contamination to remain thereon and to present easy and quick means for dissembling and washing. After being properly cleaned, the air cleaner and vent device may be re-assembled and the stainless steel wool material can be dipped in some dust-collecting liquid such as castor oil or mineral oil and be coated throughout its effective area with a thin film of the oil. In addition to providing the means for cleaning air which is allowed to pass through the vent 15, the device also prevents dust and other air-borne impurities from entering into the tank during transporting of the milk.

It may thus be seen that I have devised a combined air cleaner and vent which will freely permit air to enter and leave a sanitary opening through the tank so as to prevent damage to the tank and pumping equipment and at the same time provide a means for continuously preventing dust and air-borne contamination from entering the tank whether it be in travel or in other operations.

It will, of course, be understood that various changes may be made in the form, details, arrangement and proportions of the various parts without departing from the scope of my invention.

What is claimed is:

1. A combined air cleaner and vent device for a sanitary milk tank and the like comprising, an upstanding open-ended tubular baffle having attachment means at the lower end for securing the air cleaner in dust-free relation in communication with the upper air space in said tank, said baffle having abutment means at a lower position extending laterally inwardly and outwardly therefrom, a mass of removable filter material such as stainless steel wool disposed within the upper portion of said baffle, a second mass of removable filter material such as steel wool circumferentially surrounding an upper area of said baffle, a perforate plate disposed within said tubular baffle and removably and freely supported by said abutment, a second perforate plate annularly disposed about said baffle and removably and freely supported upon said abutment for supporting the outer mass of filter material, and a detachable cap protectively surrounding the filter material and the upper end of said baffle, said baffle and masses of filter material providing a tortuous pathway for filtering air entering and leaving said tank during emptying and filling of said tank.

2. A combined air cleaner and vent device for a sanitary milk tank and the like comprising, an upstanding open-ended tubular baffle having attachment means at the lower end for securing the air cleaner in dust-free relation in communication with the upper air space in said tank, said baffle having annular abutment means at a lower position extending peripherally inward and outward thereabout and further having perforations formed through the side walls thereof medially of the upper end and the attachment means, a cleanable mass of filter material disposed within the tubular baffle in covering relation with said side wall perforations, a second mass in tubular form of cleanable filter material peripherally surrounding in close contact said baffle at the perforated area thereof, a perforate plate disposed within said tubular baffle and removably and freely supported by the inwardly extending peripheral abutment, a second perforate plate annularly disposed about said baffle and removably and freely supported upon the outwardly extending abutment and in turn supporting the outer tubular mass of filter material, and a detachable cap having a closed end overlying and surrounding said filter material, the perforate plates and said tubular baffle, the cross-sectional configuration of each of the baffle, the inner mass of filter material, the outer mass of filter material and the detachable cap, being constant for substantially the height thereof and providing plain vertical surfaces for complete separation and cleaning thereof.

References Cited in the file of this patent

UNITED STATES PATENTS

| | | |
|---|---|---|
| 1,402,348 | Garner | Jan. 3, 1922 |
| 1,739,093 | Ruby | Dec. 10, 1929 |
| 1,841,691 | Wilson | Jan. 19, 1932 |
| 1,984,836 | Kreis | Dec. 18, 1934 |